(12) United States Patent
Kenerly

(10) Patent No.: US 6,970,797 B2
(45) Date of Patent: Nov. 29, 2005

(54) METHOD AND PRODUCT FOR PROCESSING SYSTEM TEST DATA

(75) Inventor: Matthew Traye Kenerly, Winter Garden, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 83 days.

(21) Appl. No.: 10/609,796

(22) Filed: Jun. 27, 2003

(65) Prior Publication Data

US 2004/0267476 A1 Dec. 30, 2004

(51) Int. Cl.[7] .................. G01R 27/28; G01R 31/00; G01R 31/14; G06F 19/00
(52) U.S. Cl. .................................... 702/119
(58) Field of Search .................. 702/119, 117, 123; 379/22.04, 1, 5, 377, 27.01; 375/222–224; 370/248–249, 370/241, 498

(56) References Cited

U.S. PATENT DOCUMENTS

| | | | |
|---|---|---|---|
| 5,680,391 A | 10/1997 | Barron et al. ............... 370/241 |
| 5,848,127 A | 12/1998 | Levitan et al. ................. 379/5 |
| 6,078,593 A | 6/2000 | Eames et al. ............... 370/498 |
| 6,404,855 B2 | 6/2002 | Beck ....................... 379/27.01 |
| 6,477,238 B1 * | 11/2002 | Schneider et al. ....... 379/22.04 |
| 6,574,333 B1 | 6/2003 | Manchester et al. ........ 379/377 |
| 6,671,312 B2 * | 12/2003 | Lanier et al. ............... 375/222 |
| 6,707,886 B2 * | 3/2004 | Erving et al. ............. 379/1.04 |
| 2003/0235242 A1 * | 12/2003 | Fitch et al. ................ 375/224 |

* cited by examiner

*Primary Examiner*—John Barlow
*Assistant Examiner*—Aditya Bhat
(74) *Attorney, Agent, or Firm*—Cantor Colburn LLP

(57) ABSTRACT

A method for processing system test data is provided. The data is received in digital format in response to a system test and parsed to extract information relating to a system test site and a system component at the test site in need of maintenance. The parsed data is saved as new data to a previously populated database containing old data. The database is queried to compare the new data against the old data, and a report is generated that identifies a difference between the new data and the old data, thereby identifying a newly added data entry representative of a component in need of maintenance.

6 Claims, 3 Drawing Sheets

Orlando Testability Report

| WC | RT Address | PG Count | Site | System | Int/ Unv | Ver/ Code | EDLC/ OPT | DCTP | Date/ Ref | Tested/ TN | TTN/PMA |
|---|---|---|---|---|---|---|---|---|---|---|---|
| | Orlando Main | | | | | | | | | | |
| 179 | 123 Main St. | PG71 2001-2100 | 5930A | 9044 | U | 27 | DO | PG56 551 | 06/19/03 | 432-1234 | |
| 179 | 123 Main St. | PG73 3001-3100 | 5930A | 5057 | U | 27 | DO | PG56 551 | 06/19/03 | 543-2345 | |
| 179 | 123 Main St. | PG72 1101-1200 | 5930A | 9214 | U | 27 | DO | PG56 551 | 06/19/03 | 654-3456 | |
| 179 | 123 Main St. | PG64 1601-1700 | 3105H | 2066 | U | 42 | DO | FPG75 8403 | 06/19/03 | 432-3456 | |
| 179 | 456 North St. | PG71 1001-1100 | 3105H | 2088 | U | 42 | DO | FPG75 8403 | 06/19/03 | 543-1234 | |
| 179 | 789 South St. | PG73 2001-2100 | 3105H | 2077 | U | 42 | DO | FPG75 8403 | 06/19/03 | 654-2345 | |

FIG. 3

METHOD AND PRODUCT FOR PROCESSING SYSTEM TEST DATA

BACKGROUND OF THE INVENTION

The present disclosure relates generally to a method and product for processing system test data, and particularly to a method and computer program product for processing digital loop carrier test data in response to a digital loop carrier test for identifying which if any system components in a telephone network system are in need of maintenance.

Telephone network architectures have evolved from early analog carrier systems to presently available digital loop carrier (DLC) systems, which utilize digital technology electronics to provide high quality voice transmission in combination with high speed digital data service. As telephone network architectures have grown, so have the number of subscribers per wire center, and so have their complexity. To maintain the up-time of such complex systems, system testing is employed, which involves diagnostic signal infusion into the DLC system to determine whether a system component at a remote subscriber terminal (RST) is malfunctioning, and if it is, to issue a work order for system maintenance to occur. However, present day system testing involves the manual interpretation and processing of much data from upwards of a thousand test sites or more, which is a highly time consuming process and results in a poor response-time-to-resolution. Accordingly, there is a need in the art for a DLC test method that is efficient and provides timely response-to-resolution.

SUMMARY OF THE INVENTION

In one embodiment, a method for processing system test data is provided. The data is received in digital format in response to a system test and parsed to extract information relating to a system test site and a system component at the test site in need of maintenance. The parsed data is saved as new data to a previously populated database containing old data. The database is queried to compare the new data against the old data, and a report is generated that identifies a difference between the new data and the old data, thereby identifying a newly added data entry representative of a component in need of maintenance.

In another embodiment, a computer program product for processing system test data is provided. The product includes a storage medium, readable by a processing circuit, storing instructions for execution by the processing circuit for performing the method described above.

BRIEF DESCRIPTION OF THE DRAWINGS

Referring to the exemplary drawings wherein like elements are numbered alike:

FIGS. 2–4 depict graphical user interface screens for implementing an embodiment of the invention.

DETAILED DESCRIPTION OF THE INVENTION

An embodiment of the invention provides a method and a computer program product for processing digital loop carrier test data in response to a digital loop carrier test for identifying which if any system components are in need of maintenance. While a digital loop carrier is depicted as an exemplary telephone system that the present invention may be applied to, it will be appreciated that the invention may be applicable to other network systems having electronic hardware components that may need periodic testing and maintenance, such as security systems for example.

Figure 1:
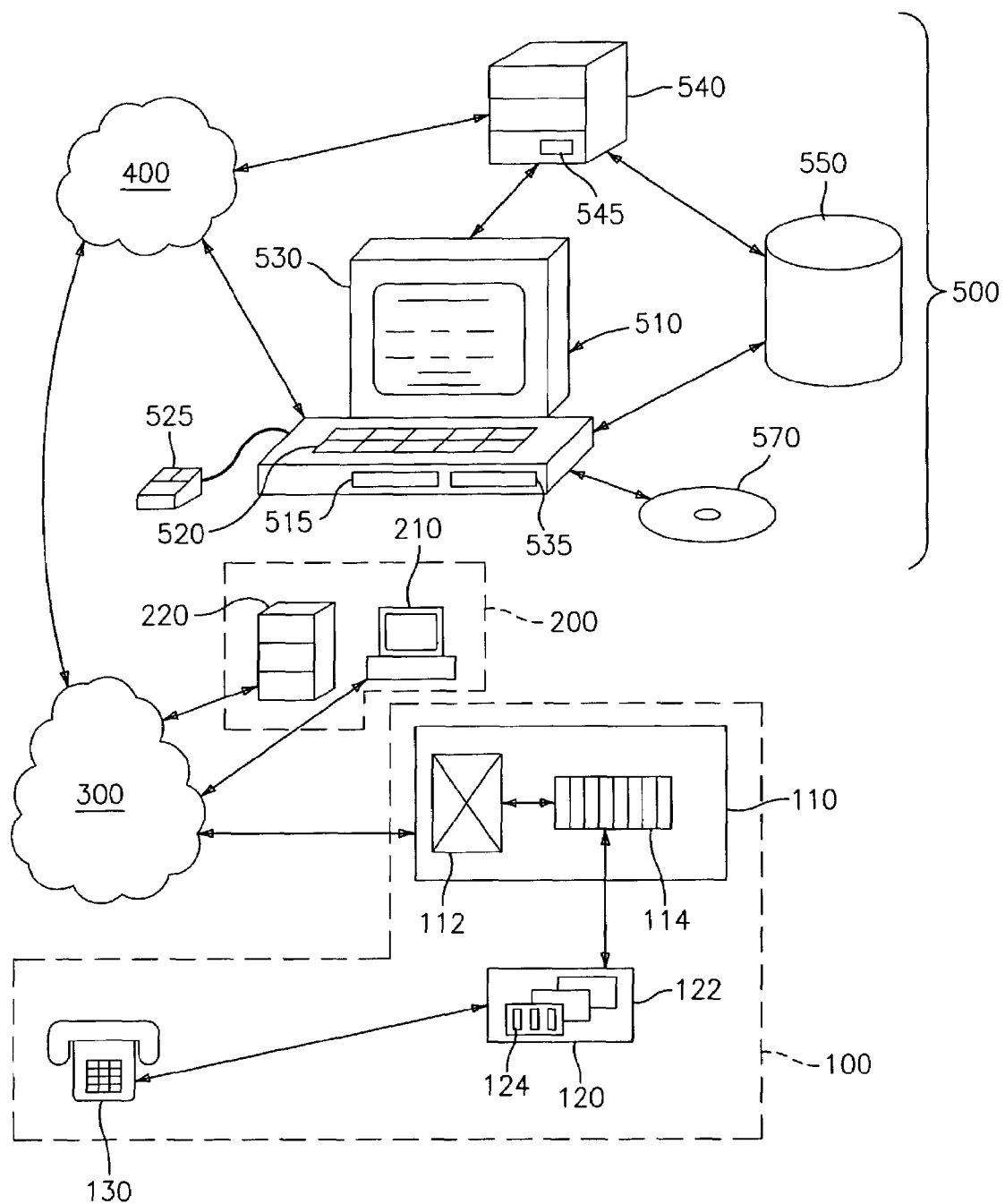
FIG. 1 depicts a computer system in signal communication with a network for receiving and processing system test data in accordance with an embodiment of the invention.

FIG. 1 depicts an exemplary digital loop carrier system (DLC) 100 for a telephone network in signal communication with a DLC tester 200 via a network 300. In an embodiment, network 300 is in signal communication with another network 400, which is in signal communication with a computer system 500. Networks 300 and 400 may be different networks, such as an Internet and Intranet, for example, or may be the same network.

In an exemplary embodiment, DLC 100 includes a local exchange building (LEB) 110 having a local exchange switch (LES) 112 and a local exchange terminal (LET) 114, a remote subscriber terminal (RST) 120, which is exemplary of one of many RSTs, and a telephone 130, which is exemplary of one of many telephones. In an embodiment, RST 120 may be one of several RSTs, and telephone 130 may be one of 2,016 telephones. RST 120 includes a plurality of system boards 122, with each system board 122 having a plurality of components 124. While reference is made herein to system boards 122 and components 124, it will be appreciated that other system hardware devices may also be employed. Successful telephone communication involving DLC 100 relies in part upon the proper maintenance of system boards 122 and components 124 (hereinafter referred to generally as RST 120). To test for proper maintenance of RST 120, DLC tester 200 is employed, which may be owned and operated by a party other than the owner of DLC 100. In an embodiment, DLC tester 200 uses signal processing techniques, discussed further below, controlled by a computer 210 or a server 220 in signal communication with RST 120 via network 300 and signal paths in DLC 100. The application software running on computer 210 periodically tests the hardware at RST 120 and generates a file of data representing the operating or non-operating conditions of system boards 122 and components 124 at RST 120. As will be described in more detail below, this data is processed by computer system 500 for determining which if any RST's 120 may require maintenance.

In an embodiment, DLC tester 200 sends on a weekly basis to computer system 500, via email across networks 300, 400, a set of test data in digital format that is representative of the operating or non-operating conditions of system boards 122 and components 124 at each RST 120 in DLC 100. The set of data provided by DLC tester 200 may include a variety of information, such as: data stream header, date of test, geographical region of DLC 100, identification of wire center within the geographical region, test site code within the wire center, address of RST 120, system board 122 identifier, component 124 identifier, pair gain count, test pair identifier, failure mode code, or any other pertinent information relating to the testing of DLC 100. The data generated by DLC tester 200 is received at computer system 500 and processed as discussed below.

In an embodiment, computer system 500 includes a computer 510, a server 540, a storage device 550, all in signal communication with each other, and a computer program product 570, such as a compact disc (CD) or any other suitable storage medium, for example, including instructions (application software) readable and executable by a processing circuit 515 at computer 510 or by a processing circuit 545 at server 540. In an alternative embodiment, computer 510 and server 540 may be integral, or computer 510 may be operational for implementing an embodiment of the invention in the absence of server 540. In an embodiment, computer 510 includes a keyboard 520, a pointing device 525, such as a mouse for example, a display 530, and a port 535 for receiving CD 570. Display 530 is a graphical display for displaying a graphical user interface (GUI) 800 provided by the application software on CD 570 and discussed below in reference to FIG. 4.

In an embodiment, the application software on CD 570 includes instructions for receiving DLC test data in digital format in response to a system test on DLC 100. The DLC test data may be received via email across networks 300, 400, via a CD similar to CD 570, or by any other suitable data transfer means. In response to the DLC test data being received at computer 510, the application software parses the data to extract information relating to the systems and components tested, such as system board 122 and components 124 at RST 120, and saves the parsed data as new data to a database at storage device 550, which was previously populated with old data. As used herein, the term new data refers to DLC test data taken in the most recent test, and the term old data refers to the prior contents of the database at storage device 550. In an embodiment, the parsing of the DLC test data results in the parsed data containing information relating only to a system board 122 or a component 124 that is in need of maintenance. However, it will be appreciated that other parsing strategies may be employed that capture other data content.

Figure 2:
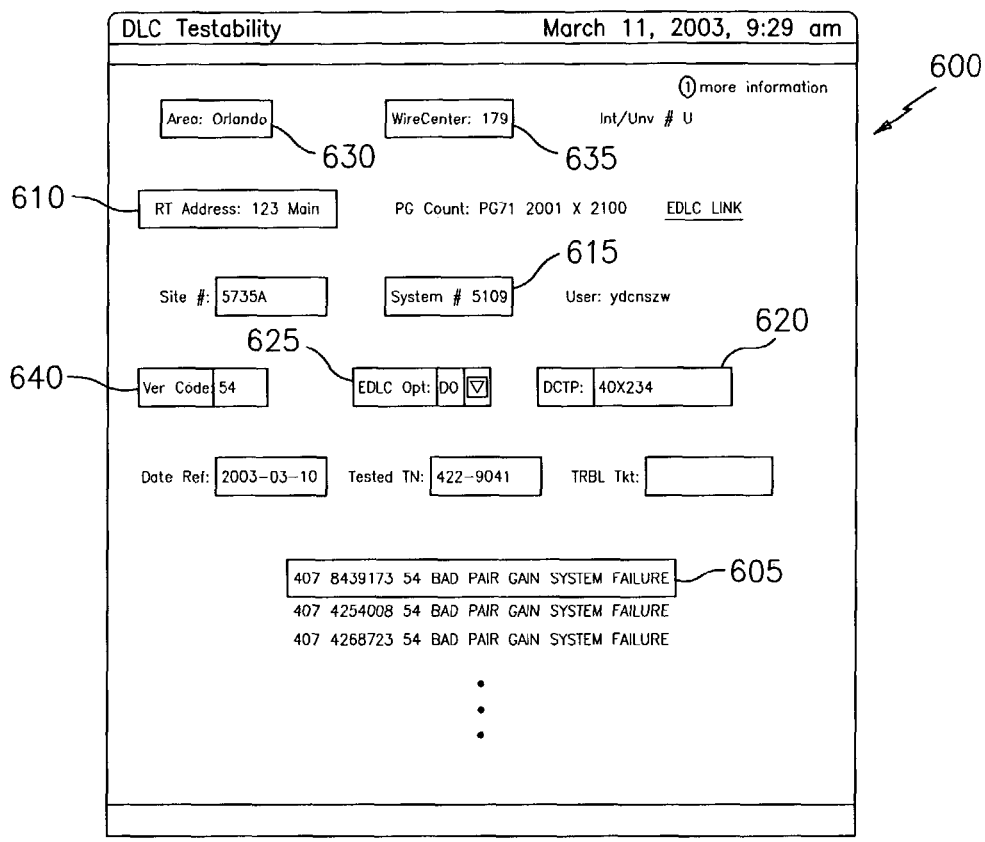

The application software also includes instructions for querying the database to compare the new data against the old data, and for generating a report at screen 600 (also referred to herein as report 600), best seen by now referring to FIG. 2, that provides a user, such as a maintenance person, with information relating to hardware in DLC 100 that is in need of maintenance. New data added to the database at storage device 550 represents a system board 122 or a component 124 (or more generally, hardware in DLC 100) that was not in need of maintenance in response to the last DLC test, but now is. This newly added data is marked for quick recognition by the application software or CD 570 for maintenance personnel using red text or boxed text 605, for example.

The contents of the report 600 generated by the application software may also include a reference to the particular RST 120 (RT Address 610), system board 122 (System #615), and component 124 (DCTP 620), that is in need of maintenance. Other information that may be included in report 600 includes: the work group responsible for performing the maintenance work (EDLC Opt. 625); the geographic area of the work site (Area 630); an identifier for the wire center involved (Wire Center 635); and other information as depicted in FIG. 2 and discussed below as appropriate. In an embodiment, report 600 is used weekly by maintenance personnel to specifically identify devices in need of maintenance. Another report at screen 700 (also referred to herein as report 700), best seen by now referring to FIG. 3, provides a list of all devices in need of maintenance sorted by the location of RST 120 (RT Address 610). Upon successfully completing the maintenance work on the defective device, authorized maintenance personnel may delete the associated data record from the database by clicking on the related data row and selecting an "Edit-Delete" command from a menu bar. By continually updating the database, only those system components in need of maintenance are retained.

Figure 4:
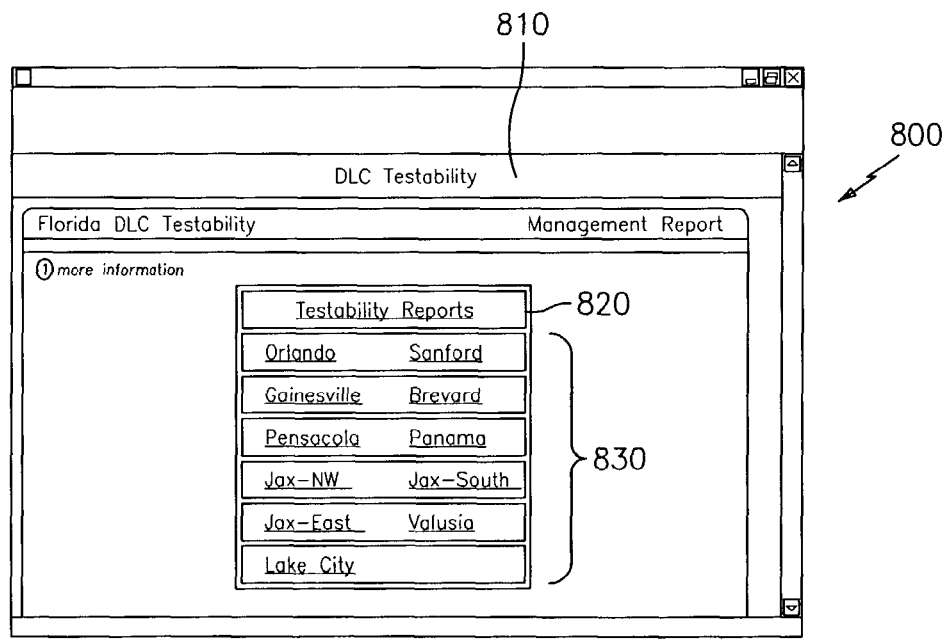

Reports 600 and 700 depicted in FIGS. 2 and 3, respectively, are available to the user via GUI 800, best seen by now referring to FIG. 4, which is entitled DLC Testability 810, and makes available Testability Reports 820 relating to various geographic locations 830. GUI 800 utilizes a variety of icons and actionable screen elements, such as selection menus, scroll-down menus, data entry boxes, radio buttons, hyperlinked text, navigation buttons, and selection tabs, for example. By clicking on a particular geographic location 830, the user is taken into a lower-level GUI screen, such as report 700, and by clicking on a particular entry in report 700, the user is taken into a further lower-level GUI screen, such as report 600, which contains the details record regarding the DLC test site information allowing personnel to update and status the particular system. The user can back out of a particular screen to a previous screen, or move from one screen to another, using GUI navigation buttons as discussed above and made available via the application software.

Through GUI 800, which is in signal communication with the database at storage device 550 via the application software, a user is capable of accessing the data at the database, requesting the generation of a DLC Testability report 820, and viewing the contents of the generated report 600, 700, thereby enabling effective and efficient maintenance scheduling and rapid issue resolution. Upon successfully completing maintenance work on the defective device, authorized maintenance personnel may identify a system component that has been repaired by entering a verification code 640 on screen 600. Alternatively, the associated data record may be deleted from the database as discussed above.

An exemplary application of the invention as disclosed herein shall now be described with reference to the various figures in combination. On a weekly basis, a third party DLC tester 200, such as a contractor for example, performs a DLC test of DLC 100 and emails the test results via networks 300, 400 to computer system 500. At computer system 500, processing circuit 515 runs application software to parse and store the data at storage device 550 as discussed above. Armed with a database of parsed data, maintenance personnel may then timely access the data via an Internet or Intranet connection and GUI 800, and run DLC Testability Reports 820 for, a geographic region of interest. In response to the information in reports 600, 700, maintenance personnel may then schedule timely maintenance repair work in the field. A DLC test performed on a Friday may be analyzed over the weekend and data made available the following Monday for maintenance personnel to act upon, which is a substantial improvement over existing methods.

Some embodiments of the invention may include some of the following advantages: ease of maintenance scheduling; rapid maintenance resolution; shared maintenance records; access to maintenance database from multiple and remote locations using Internet or Intranet connections; availability of valid, thorough and timely data that facilitates the prevention of future system failures; and, prevention of re-work resulting from mis-scheduled maintenance needs.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for processing system test data, the product comprising;
   a storage medium, readable by a processing circuit, storing instructions for execution by the processing circuit for:
   receiving data in digital format in response to a system test;
   parsing the data to extract information relating to a system test site and a system component at the test site in need of maintenance, and saving the parsed data as new data to a previously populated database containing old data;
   querying the database to compare the new data against the old data; and
   generating a report that identifies a difference between the new data and the old data, thereby identifying a newly added data entry representative of a component in need of maintenance;
   wherein the storage medium further includes instructions for execution by the processing circuit for:
   generating a report that includes a reference to a remote terminal, a system within the remote terminal, and a component within the system, that is in need of maintenance;
   generating a report that arranges the database data by the location of the system component in need of maintenance; and
   generating a report that includes a reference to the group responsible for performing maintenance work on the component in need of maintenance.

2. The product of claim 1, wherein the storage medium further includes instructions for execution by the processing circuit for:
   removing data from the database where the associated system component no longer requires maintenance, thereby updating the database to contain data relating only to those system components in need of maintenance.

3. The product of claim 2, wherein the storage medium further includes instructions for execution by the processing circuit for:
   displaying a graphical ussr interface in signal communication with the database, the graphical user interface including means for:
   accessing the data at the database;
   requesting the generation of the report; and
   viewing the generated report.

4. A computer program product for processing system test data, the product comprising:
   a storage medium, readable by a processing circuit, storing instructions for execution by the processing circuit for:
   receiving data in digital format in response to a system test;
   parsing the data to extract information relating to a test site and a system component at the test site in need of maintenance, and saving the parsed data as new data to a previously populated database containing old data;
   querying the database to compare the new data against the old data;
   generating a report that identifies a difference between the new data and the old data, thereby identifying a newly added data entry representative of a component in need of maintenance;
   generating a report that includes a reference to a remote terminal, a system within the remote terminal, and a component within the system, that is in need of maintenance;
   generating a report that arranges the database data by the location of the system component in need of maintenance;
   generating a report that includes a reference to the group responsible for performing maintenance work on the component in need of maintenance;
   removing data from the database where the associated system component no longer requires maintenance, thereby updating the database to contain data relating only to those system components in need of maintenance;
   displaying a graphical user interface in signal communication with the database, the graphical user interface including means for:
   accessing the data at the database;
   requesting the generation of the report;
   viewing the generated report; and
   identifying a system component that has been successfully maintained.

5. The product of claim 4, wherein the graphical user interface further includes means for:
   removing the data from the database that is identified with the system component that has been successfully maintained.

6. The product of claim 1, wherein the system is a digital loop carrier.

* * * * *